Patented June 23, 1931

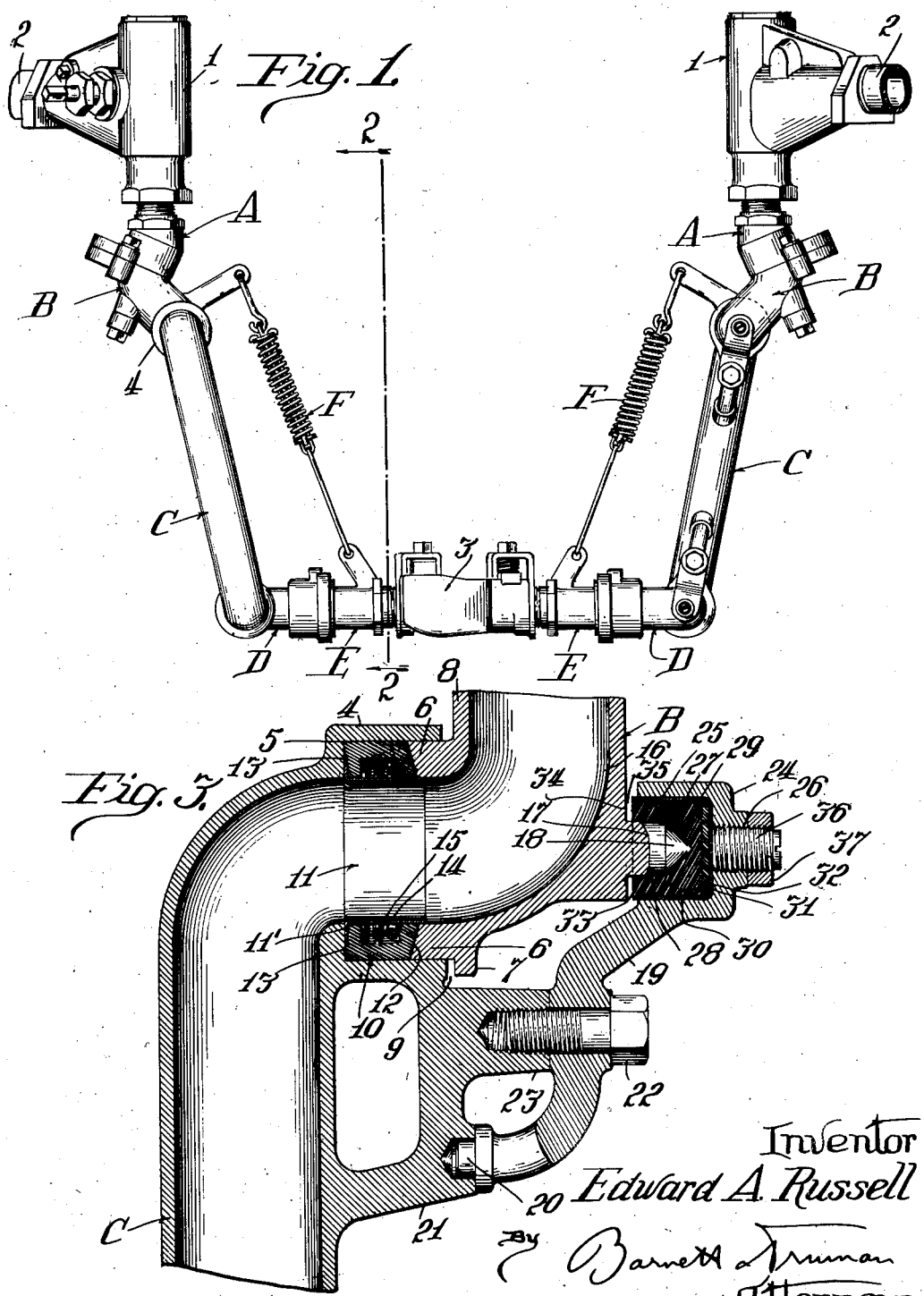

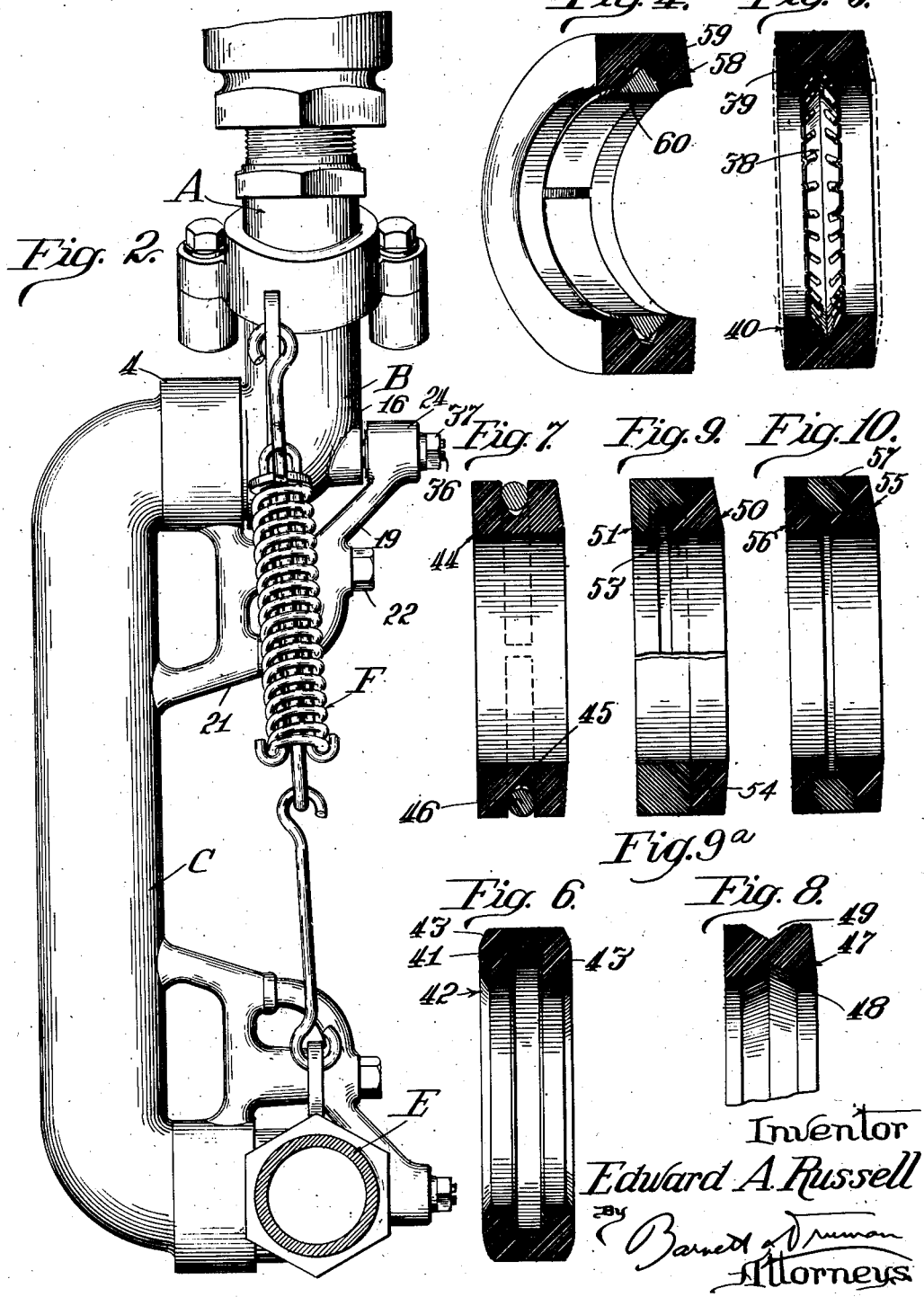

1,811,649

UNITED STATES PATENT OFFICE

EDWARD A. RUSSELL, OF CHICAGO, ILLINOIS, ASSIGNOR TO VAPOR CAR HEATING COMPANY, INC., OF CHICAGO, ILLINOIS, A CORPORATION OF NEW YORK

ADJUSTABLE THRUST BEARING AND SEALING MEANS FOR FLEXIBLE PIPE JOINTS

Application filed June 13, 1929. Serial No. 370,675.

This invention relates to certain new and useful improvements in adjustable thrust bearing and sealing means for flexible pipe joints, and more particularly to the combination of an improved form of adjustable thrust bearing with an improved gasket for sealing the joint against the escape of steam or other fluid from within the conduit, the adjustment of the bearing serving to take up wear and also to adjust the pressure on the ends of the sealing gasket.

The invention is here shown as applied to a flexible metallic conduit structure of the type disclosed in the co-pending application of Phillips, Serial No. 243,328, filed December 29, 1927. This flexible conduit comprises a plurality of metallic pipe sections, the end of one member being telescoped within the mating end of another member and journaled therein so that the sections are relatively rotatable about the axis of the conduit. Means is provided for sealing the joint between the members against the escape of steam or other fluid carried in the flexible conduit. At least one of the members is formed with an elbow bend adjacent the joint and a bearing stud projects from the elbow in line with the axis of the joint between the members. A bracket arm secured to and projecting from the other section is formed with a bearing seat for the stud, so that two longitudinally spaced bearings are provided between the two relatively rotatable sections. The bearing that supports the stud is also formed to accept the outward thrust of the fluid contained within the conduit which tends to separate the telescoped conduit sections. The improved socket thrust bearing shown herein is of the type disclosed in the co-pending application of Bruce et al., Serial No. 325,876, filed December 13, 1928. According to the present invention, additional means are provided for adjusting this socket bearing toward the joint so as to take up wear of the bearing and to adjust the inner conduit member into the outer conduit member within which it telescopes. An improved form of gasket is provided seated within an annular recess between the conduit sections and bearing at its respective ends on the two sections. Therefore, the adjustment of the socket bearing not only serves to take up wear, but is also utilized to vary the pressure on the ends of the gasket to insure its proper functioning as a sealing means. Preferably the gasket is so formed that the pressure of the fluid within the conduit tends to expand the gasket longitudinally and increase its efficiency as a sealing means.

The principal object of this invention is to provide an improved adjustable metallic pipe joint of the type briefly described hereinabove and disclosed more in detail in the specifications which follow.

Another object is to provide an improved adjustable thrust bearing for a flexible pipe joint.

Another object is to provide an improved form of gasket for use in a flexible pipe joint.

Another object is to provide an improved gasket bearing at its respective ends on the respective relatively rotatable conduit sections, in combination with means for adjusting the relative position of the conduit sections so as to determine the pressure on the ends of the gasket.

Another object is to provide an improved gasket of the type set forth hereinabove in combination with means for supporting the conduit sections so that the gasket does not support the weight of the sections, and the pressure on the ends of the gasket can be adjusted independently of the fluid pressure within the conduit.

Other objects and advantages of this invention will be more apparent from the following detailed description of certain approved forms of apparatus embodying the principles of the invention.

In the acompanying drawings:

Fig. 1 is a side elevation of one of the complete flexible conduit connections between the train pipes of two adjacent railway cars.

Fig. 2 is an end elevation on a larger scale, of one of the flexible conduits, the view being taken substantially on the line 2—2 of Fig. 1.

Fig. 3 is a central longitudinal section, on a still larger scale, through one of the flexible joint assemblies between two adjacent sections of the conduit.

Fig. 4 is a sectional perspective view of a modified form of gasket.

Figs. 5 to 10 inclusive are similar longitudinal central sections through alternative forms of gaskets suitable for use in this joint.

Referring to the drawings, at 1 is indicated the end train-pipe valve which communicates with and is secured to the train pipe 2 on the car. The flexible conduit structure comprises a plurality of flexibly articulated metallic pipe sections A, B, C, D and E, and a coupling member 3 is carried at the free end of the section E, the two couplings 3 on the conduit structures of adjacent cars being connected together when the cars are connected in a train, so that a continuous flexible conduit is formed which joins the train pipes 2 on the adjacent cars.

A yieldable supporting member indicated generally at F is utilized to support the lower members of the flexible conduit in substantially the normal position shown, when the cars and conduits are disconnected.

Each of the conduit sections A to E inclusive is connected with the adjacent section by a swiveled articulation of the improved type hereinafter set forth. Each of these swiveled connections is substantially the same, the one between sections B and C being illustrated by way of example in Fig. 3. In this particular joint, each of the sections B and C is formed with an elbow bend adjacent the joint. The member or section C is formed with an enlarged head 4 at its end in which is a cylindrical recess 5 of greater outer diameter than the bore of the conduit structure. The end of the mating conduit structure B is formed with an annular nipple 6 adapted to fit snugly within the outer end portion of recess 5 and to swivel within this recess about the axis of the bore of the relatively rotatable conduit members. An annular flange 7 in substantial alignment on its outer face with the side 8 of the conduit section B limits the projection of nipple 6 into the recess, but a clearance space 9 of substantial width normally exists between flange 8 and the outer end of enlargement 4 to permit a substantial adjustment of the nipple within the recess to adjust the pressure on the ends of the sealing gasket, as hereinafter described.

An annular gasket 10 formed of any suitable gasket composition is housed within the recess 5 and has an inner diameter conforming substantially to the inner diameter of the conduit sections. This gasket is adapted to bear at its respective ends on the inner end face 12 of nipple 6 on conduit section B, and the inner wall 13 of recess 5 in conduit section C. The joint is sealed at these two end faces of the gasket, it being immaterial whether or not a sealing fit is obtained between the outer cylindrical surface of the gasket and the inner cylindrical wall of socket 5. The form of gasket 10 shown in Fig. 3 is provided with an internal annular groove or channel 14 in which is positioned a coiled expansion spring 15, as shown. The expansion of this split ring tends to expand the gasket longitudinally thus increasing the pressure against the respective end faces 12 and 13 of the conduit sections. A thin metal ferrule 11, having an annular lip 11' extending outwardly between the gasket and a portion of surface 13, may be used to enclose the spring 15 and spring-receiving channel 14. Other alternative forms of gasket suitable for use in this joint will be hereinafter described.

It will be noted that the fluid pressure within the conduit structure tends to force the end of section B out of the end of section C within which it is telescoped, and the present invention includes an improved form of adjustable thrust bearing adapted not only to accept this outward thrust and provide a second rotary bearing between the sections spaced longitudinally of the axis of the joint from the bearing between nipple 6 and the recess in which it is journaled, but also adjustable inwardly to take up wear and to provide the necessary pressure on the ends of the gasket 11.

On the outer surface of the elbow 16 of conduit section B is formed an outwardly projecting cylindrical stud or gudgeon 17 positioned concentric with the axis of the swiveled joint between the conduit sections. Preferably the end of stud 17 is in the form of an outwardly projecting cone 18, the point of which terminates in the axis of rotation of the pipe joint. A bracket arm 19 is mounted on the mating conduit section C and projects around the elbow 16 of section B so as to support the bearing for stud 17. In the form here shown, a stud 20 on one end of bracket arm 19 fits within a socket in the boss or enlargement 21 on section C, and the intermediate portion of the bracket arm is secured by a screw or bolt 22 to an outwardly projecting portion 23 of the boss 21. The outer end 24 of arm 18 is formed with a cylindrical socket 25 which is open on the inner end facing the pipe joint but is closed at its outer end except for the threaded opening 26 hereinafter referred to.

The improved bushing consists of a cylindrical block 27 of suitable bearing composition, formed with a central cylindrical socket 28 open at the exposed end of the bearing block 27 and having a conical inner end 29. The stud 17 is adapted to be rotatably journaled in the cylindrical recess or socket 28 and the conical end 18 of the stud engages the inner conical end 29 of the socket to take up the end thrust. The bearing block 27 is inclosed in a metallic ferrule or thimble 30 which is open at its inner end and closed at its outer end 31. A steel reinforcing plate 32 is preferably positioned in the closed end of the thimble.

The bearing block 27 is preferably formed of a material known as "Noscorite," this being a composition of a phenolic condensation product and a natural clay having exceptional lubricating qualities. This composition material is very hard but is self-lubricating. The composition has a maximum wear-resisting quality while at the same time developing a minimum amount of friction when used in connection with the metallic bearing stud 17. While this form of composition bushing is preferred, other materials might be used without departing from the broad principles of this invention.

It will be noted in Fig. 3 that the inner end 33 of the bearing block 27 projects beyond the open end of socket 25 but does not engage with the flat surface 34 at the base of bearing stud 17. A certain amount of clearance is left at 35 to allow for wear of the bushing 27. Under normal conditions, the outward thrust of the elbow 16 will be taken entirely by the conical point 18 of the stud bearing within the conical recess 29 in the bushing 27. These mating surfaces wear very slowly, but if in time the wear is sufficient the surface 34 of the section B will engage the outer end 33 of the bearing block so as to form an effective thrust bearing at this point.

It will now be apparent that as wear takes place on the thrust bearing surfaces, the internal pressure within the conduit will tend to force the conduit section B out of the conduit section C thus descreasing the sealing pressure on the ends of gasket 10. To offset this means is provided for adjusting the thrust bearing assembly inwardly, thus in turn providing means whereby the section B may be adjusted into the recess 5 so as to increase the pressure on the ends of the sealing gasket 10. For this purpose a set screw 36 is threaded into the opening 26 in the outer end of the bracket arm 19, this screw 36 bearing against the inner end 31 of thimble 30 whereby the entire thrust bearing assembly may be adjusted within the socket 24. By screwing in the set screw 36 the thrust bearing assembly can be pushed more or less out of the socket so as to take up wear or move the elbow conduit section B further into the gasket recess 5 in conduit member C. A lock nut 37 is provided on the outer end of set screw 36 to secure this screw in its adjusted position.

It will now be noted that the entire weight of the suspended conduit assembly below the joint described is supported by the two spaced coaxial sleeve bearings on the nipple 6 and stud 17 respectively, and that the outward thrust due to the pressure within the conduit is taken up by the thrust bearing 18, so that none of these pressures are imposed upon the gasket 10, thus materially increasing the life and effectiveness of the gasket. The necessary pressure on the ends of the gasket for holding same in sealing engagement with the respective end surfaces of the two conduit sections is obtained by the expansion member 15 and the expansion force of the steam acting within the channeled inner surface of the gasket, and the adjustable pressure obtained by the adjusting screw 36 acting through the thrust bearings. As wear occurs on the thrust bearing members, and the sealing surfaces of the gasket, this wear can be compensated for by turning in the screw 36 to move the thrust bearing and the conduit section B further inward toward the conduit member C.

A number of alternative forms of gaskets suitable for use in this combination are disclosed in Figs. 4 to 8 respectively. In the form shown in Fig. 4, the gasket 58 is formed with a channel 59 of triangular cross-section, in which is positioned a split expansion ring 60. In the form shown in Fig. 5, an expansible spring finger ferrule 38 is molded into an annular recess 39 of triangular cross section formed within the gasket 40. The original molded form of the gasket assembly is indicated in dotted lines, the gasket being compressed when in use into the solid line position thereby placing the ferrule 38 under compression.

In Fig. 6, a channeled metallic ferrule 41 is fitted within a correspondingly shaped recess in gasket 42, and the end faces of the gasket are curved as indicated at 43 and adapted to be compresed into fitting engagement with the sealing surfaces 12 and 13 in the metallic conduit structure.

In Fig. 7, the gasket 44 is provided with an external channel 45 in which is fitted a metallic compression ring 46, the inward movement of this ring tending to expand the gasket longitudinally from the dotted line position to the solid line position.

In Fig. 8, the annular gasket 47 is provided with inner and outer annular channels 48 and 49, whereby the flexibility and longitudinal elasticity of the gasket is increased.

The gasket shown in Figs. 9 and 9ª consists of two separate annular sections 50 and 51, the section 50 being of a relatively hard composition adapted to engage with the rotating nipple 6 and the section 51 being of a softer composition suitable for engaging nonrotatably with the inner surface 13 in conduit section C and also with the cylindrical outer wall of recess 5. The gasket sections 50 and 51 can be provided with overlapping portions as indicated at 53 in Fig. 9, or may engage along a radial plane as indicated at 54 in Fig. 9ª. The two sections 50 and 51 may either be formed separately or may be molded together as a unitary gasket structure.

The gasket shown in Fig. 10 comprises a pair of annular gasket members 55 and 56 of relatively hard composition, these members being externally channeled to receive portions of an annular gasket member 57 of a softer composition. The two members 55 and 56 will provide the sealing engagement with the respective end surfaces of the conduit members, and the intermediate section 57 will seal against the outer cylindrical wall of recess 5 and also increase the elasticity of the gasket assembly and when expanded by the internal steam pressure tends to force the two members 55 and 56 apart and thus expand the gasket longitudinally.

I claim:

1. In a metallic flexible pipe conduit, a pair of conduit sections having their end portions journaled together for relative rotation about the central axis of the conduit, there being an annular gasket receiving recess formed between the members one end wall of the recess being formed one one member and the other end wall on the other member, a gasket within the recess and bearing at its respective ends on the respective end walls of the recess, one of the conduit sections having an elbow bend adjacent the pipe joint, a bearing stud projecting from the elbow in line with the axis of the pipe joint, a bracket arm projecting from the other conduit section, a socket thrust bearing mounted in the bracket arm, and means for adjusting the socket bearing toward the joint to take up wear and increase the pressure on the ends of the gasket.

2. In a metallic flexible pipe conduit, a pair of conduit sections having their end portions journaled together for relative rotation about the central axis of the conduit, there being an annular gasket receiving recess formed between the members one end wall of the recess being formed on one member and the other end wall on the other member, a gasket within the recess and bearing at its respective ends on the respective end walls of the recess, compressible means within the gasket for increasing its longitudinal elasticity, one of the conduit sections having an elbow bend adjacent the pipe joint, a bearing stud projecting from the elbow in line with the axis of the pipe joint, a bracket arm projecting from the other conduit section, a socket thrust bearing mounted in the bracket arm, and means for adjusting the socket bearing toward the joint to take up wear and increase the pressure on the ends of the gasket.

3. In a metallic flexible pipe conduit, a pair of conduit sections having their end portions journaled together for relative rotation about the central axis of the conduit, there being an annular gasket receiving recess formed between the members one end wall of the recess being formed on one member and the other end wall on the other member, a gasket within the recess and bearing at its respective ends on the respective end walls of the recess, one of the conduit sections having an elbow bend adjacent the pipe joint, a bearing stud projecting from the elbow in line with the axis of the pipe joint, a bracket arm projecting from the other conduit section, and formed with a socket having an end opening toward the joint, a thimble mounted in the socket, a composition bushing in the thimble formed with a recess for receiving the bearing stud, and a set-screw mounted in the bracket and projecting through the closed end of the socket for adjusting the thimble inwardly to take up wear and increase the pressure on the ends of the gasket.

4. In a metallic flexible pipe conduit, a pair of conduit sections having their end portions journaled together for relative rotation about the central axis of the conduit, there being an annular gasket receiving recess formed between the members one end wall of the recess being formed on one member and the other end wall on the other member, a gasket within the recess and bearing at its respective ends on the respective end walls of the recess, one of the conduit sections having an elbow bend adjacent the pipe joint, a bearing stud projecting from the elbow in line with the axis of the pipe joint, a bracket arm projecting from the other conduit section and formed with a socket having an end opening toward the joint, a bushing mounted in the socket and formed with a recess to receive the bearing stud, and means mounted in the bracket for adjusting the bushing inwardly to take up wear and increase the pressure on the ends of the gasket.

5. In a metallic flexible pipe conduit, a pair of conduit sections having their end portions journaled together for relative rotation about the axis of the conduit, one of the sections having an enlarged cylindrical recess in the open end thereof, the other section being formed with an elbow bend adjacent its open end, this open end being journaled within the outer portion of the recess, a gasket confined within the recess and bearing at its respective ends on the inner end wall of the recess and the end of the second mentioned conduit section, a bearing stud projecting from the elbow in line with the axis of the conduit joint, a bracket arm projecting from the other conduit section, a socket thrust bearing mounted in the bracket arm and receiving the stud, and means for adjusting the socket bearing toward the joint to take up wear and move the inner conduit section into the recess to increase the pressure on the ends of the gasket.

6. In a metallic flexible pipe conduit, a pair of conduit sections having their end portions journaled together for relative rotation about the axis of the conduit, one of the sections having an enlarged cylindrical recess in the open end thereof, the other section being formed with an elbow bend adjacent its open end, this open end being journaled within the outer portion of the recess, a gasket confined within the recess and bearing at its respective ends on the inner end wall of the recess and the end of the second mentioned conduit section, compressible means within the gasket for increasing its longitudinal elasticity, a bearing stud projecting from the elbow in line with the axis of the conduit joint, a bracket arm projecting from the other conduit section, a socket thrust bearing mounted in the bracket arm and receiving the stud, and means for adjusting the socket bearing toward the joint to take up wear and move the inner conduit section into the recess to increase the pressure on the ends of the gasket.

7. In a metallic flexible pipe conduit, a pair of conduit sections having their end portions journaled together for relative rotation about the axis of the conduit, one of the sections having an enlarged cylindrical recess in the open end thereof, the other section being formed with an elbow bend adjacent its open end, this open end being journaled within the outer portion of the recess, a gasket confined within the recess and bearing at its respective ends on the inner end wall of the recess, and the end of the second mentioned conduit section, a bearing stud projecting from the elbow in line with the axis of the conduit joint, a bracket arm projecting from the other conduit section, and formed with a socket with one end opening toward the joint, a thimble mounted in the socket, a composition bushing mounted in the thimble formed with a recess for receivng the bearing stud, and means mounted in the bracket for adjusting the thimble inwardly to take up wear and move the inner conduit member into the recess to increase the pressure on the ends of the gasket.

EDWARD A. RUSSELL.